No. 727,545. PATENTED MAY 5, 1903.
H. T. KRAKAU.
DRAFT RIGGING.
APPLICATION FILED DEC. 19, 1901.
NO MODEL. 13 SHEETS—SHEET 1.
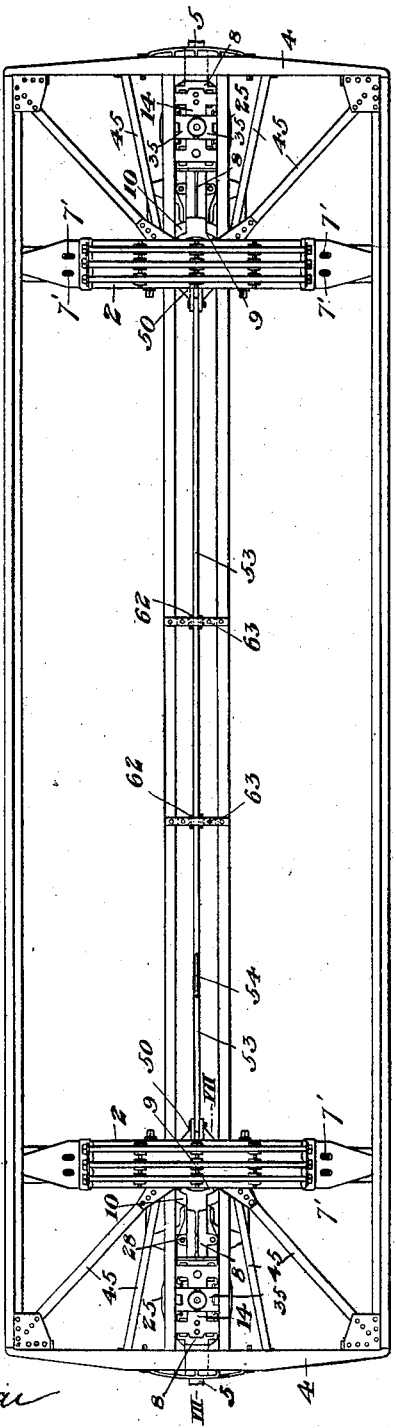
WITNESSES
INVENTOR
Harry T. Krakau
by Bakewell Byrnes
his Attorneys.

No. 727,545. PATENTED MAY 5, 1903.
H. T. KRAKAU.
DRAFT RIGGING.
APPLICATION FILED DEC. 19, 1901.
NO MODEL. 13 SHEETS—SHEET 2.

WITNESSES

INVENTOR
Harry T. Krakau
by Bakewell & Byrnes
his Attorneys.

No. 727,545. PATENTED MAY 5, 1903.
H. T. KRAKAU.
DRAFT RIGGING.
APPLICATION FILED DEC. 19, 1901.
NO MODEL. 13 SHEETS—SHEET 3.

WITNESSES
INVENTOR
Harry T. Krakau
by Bakewell & Byrnes
his Attorneys.

No. 727,545. PATENTED MAY 5, 1903.
H. T. KRAKAU.
DRAFT RIGGING.
APPLICATION FILED DEC. 19, 1901.
NO MODEL. 13 SHEETS—SHEET 4.
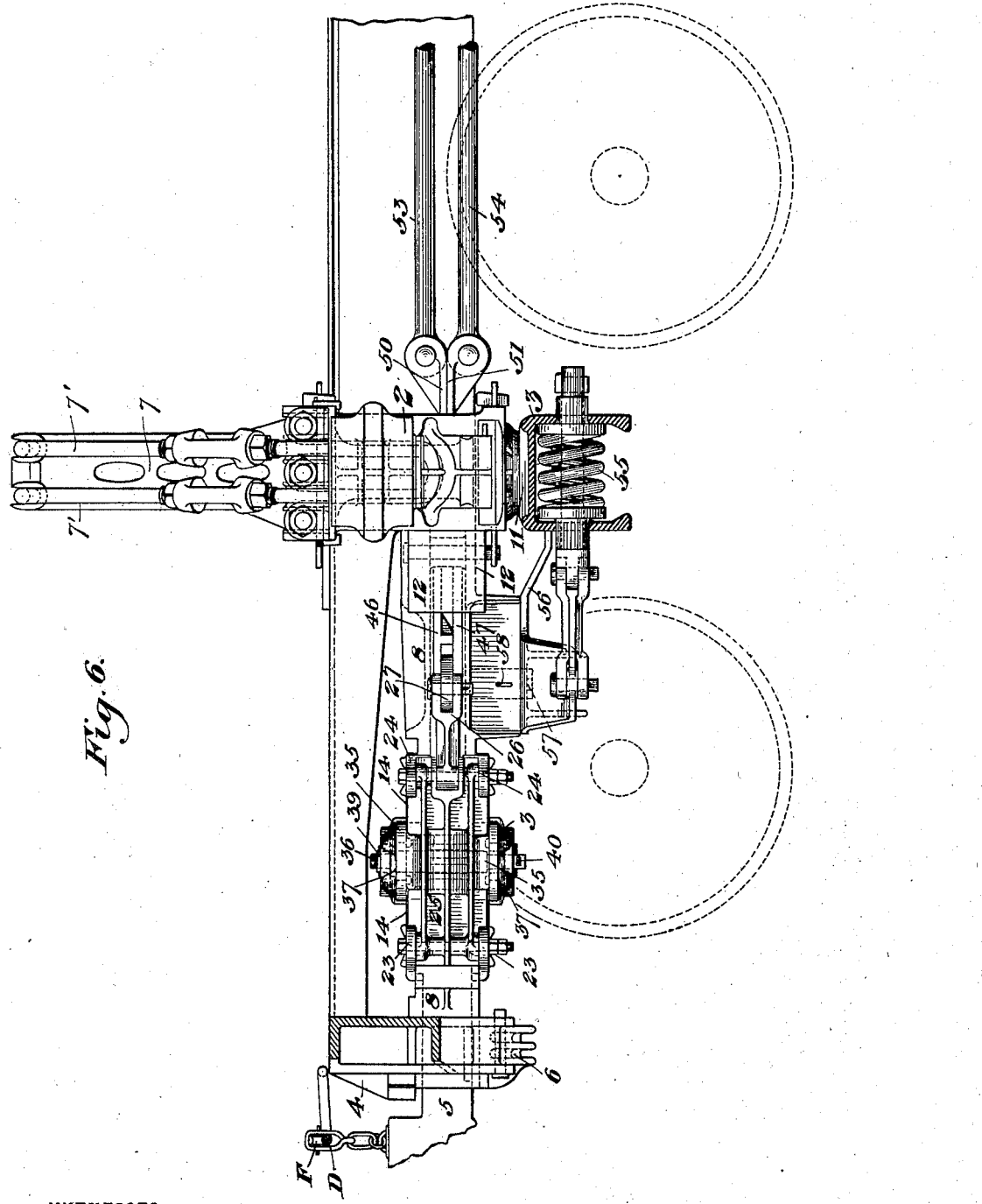

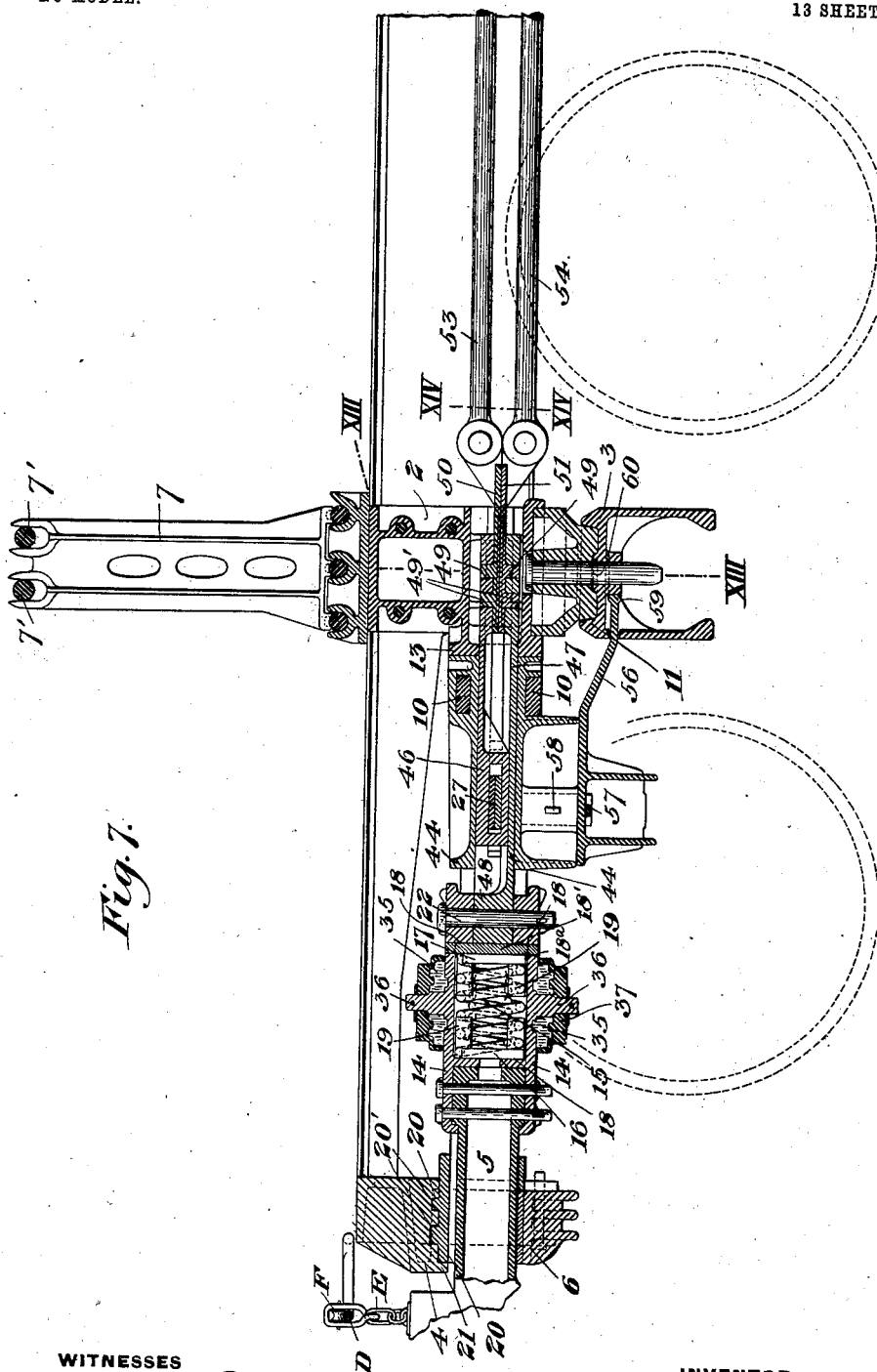

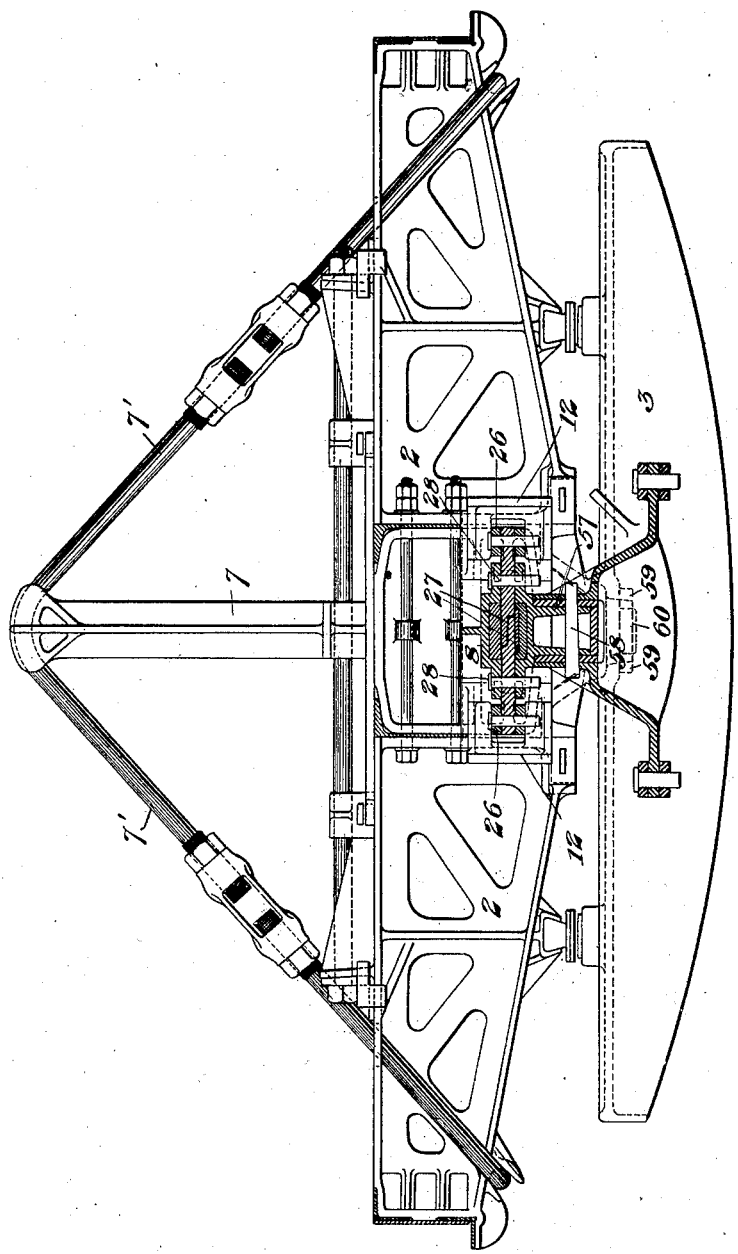

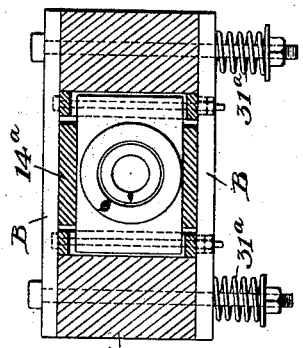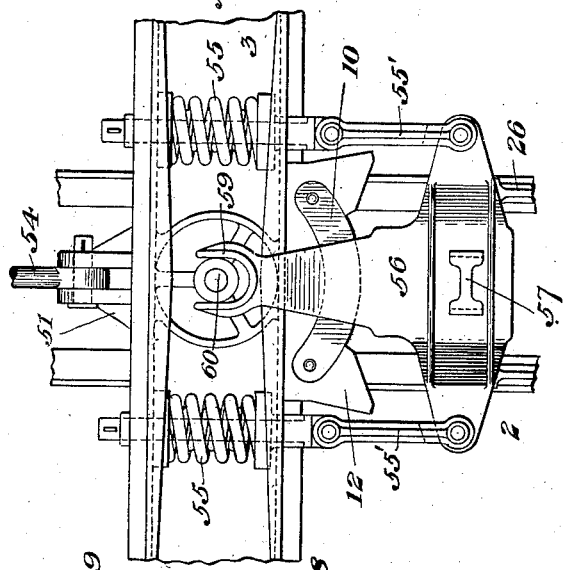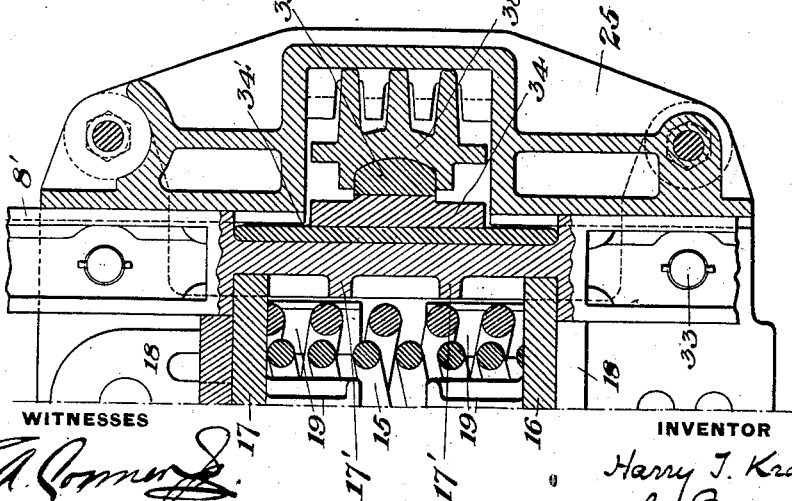

No. 727,545. PATENTED MAY 5, 1903.
H. T. KRAKAU.
DRAFT RIGGING.
APPLICATION FILED DEC. 19, 1901.
NO MODEL. 13 SHEETS—SHEET 8.

WITNESSES
INVENTOR
Harry T. Krakau
by Bakewell & Byrnes
his Attorneys.

No. 727,545. PATENTED MAY 5, 1903.
H. T. KRAKAU.
DRAFT RIGGING.
APPLICATION FILED DEC. 19, 1901.
NO MODEL. 13 SHEETS—SHEET 9.
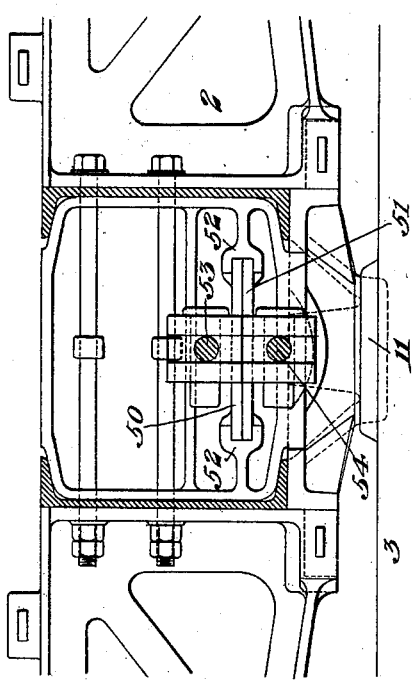
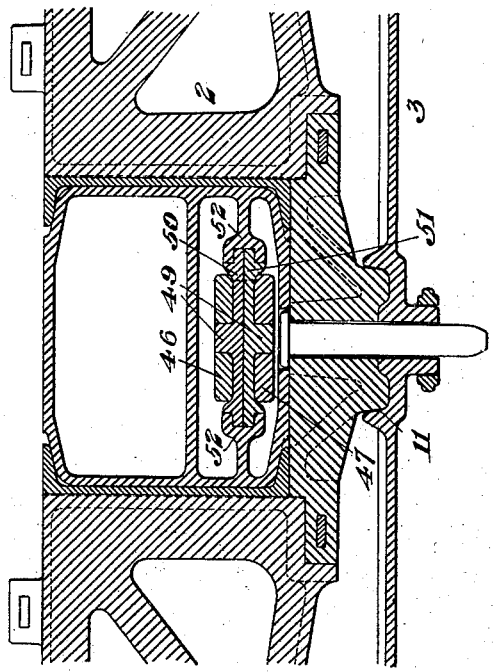
WITNESSES
INVENTOR
Harry T. Krakau
by Bakewell & Byrnes
his Attorneys.

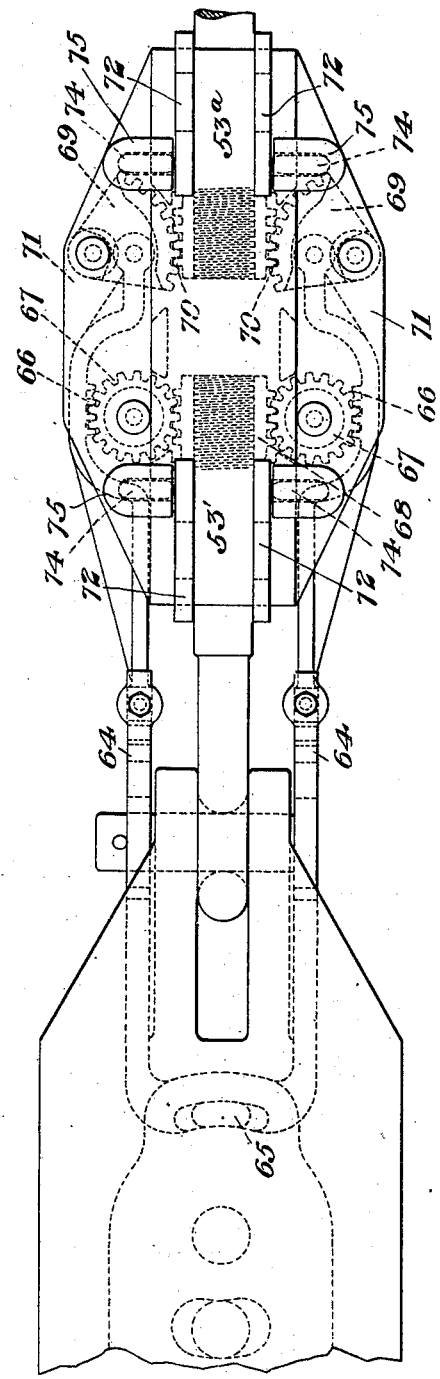

No. 727,545. PATENTED MAY 5, 1903.
H. T. KRAKAU.
DRAFT RIGGING.
APPLICATION FILED DEC. 19, 1901.
NO MODEL. 13 SHEETS—SHEET 11.
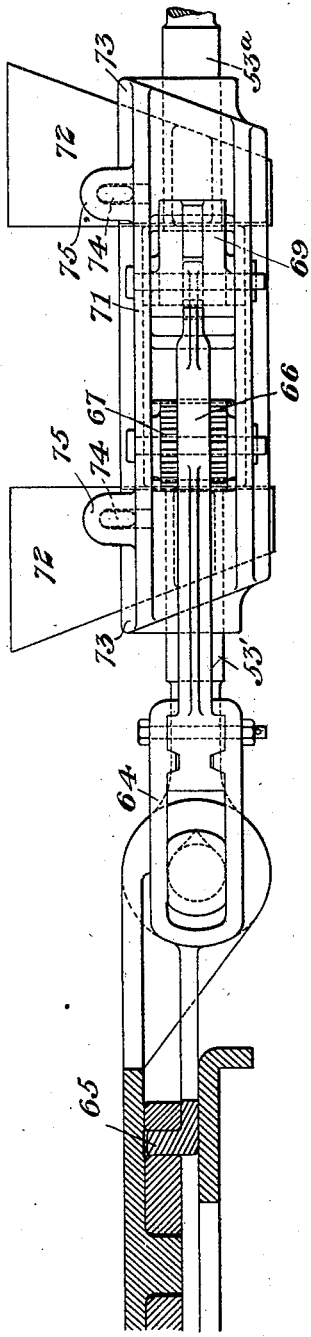
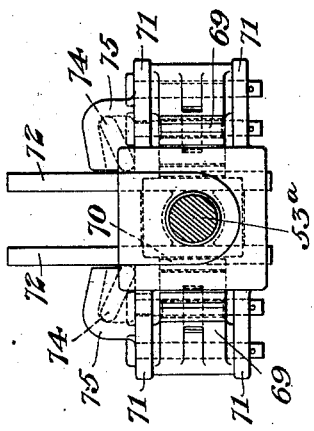
WITNESSES
INVENTOR
Harry T. Krakau
by Bakewell & Byrnes
his Attorneys.

No. 727,545. PATENTED MAY 5, 1903.
H. T. KRAKAU.
DRAFT RIGGING.
APPLICATION FILED DEC. 19, 1901.
NO MODEL. 13 SHEETS—SHEET 12.

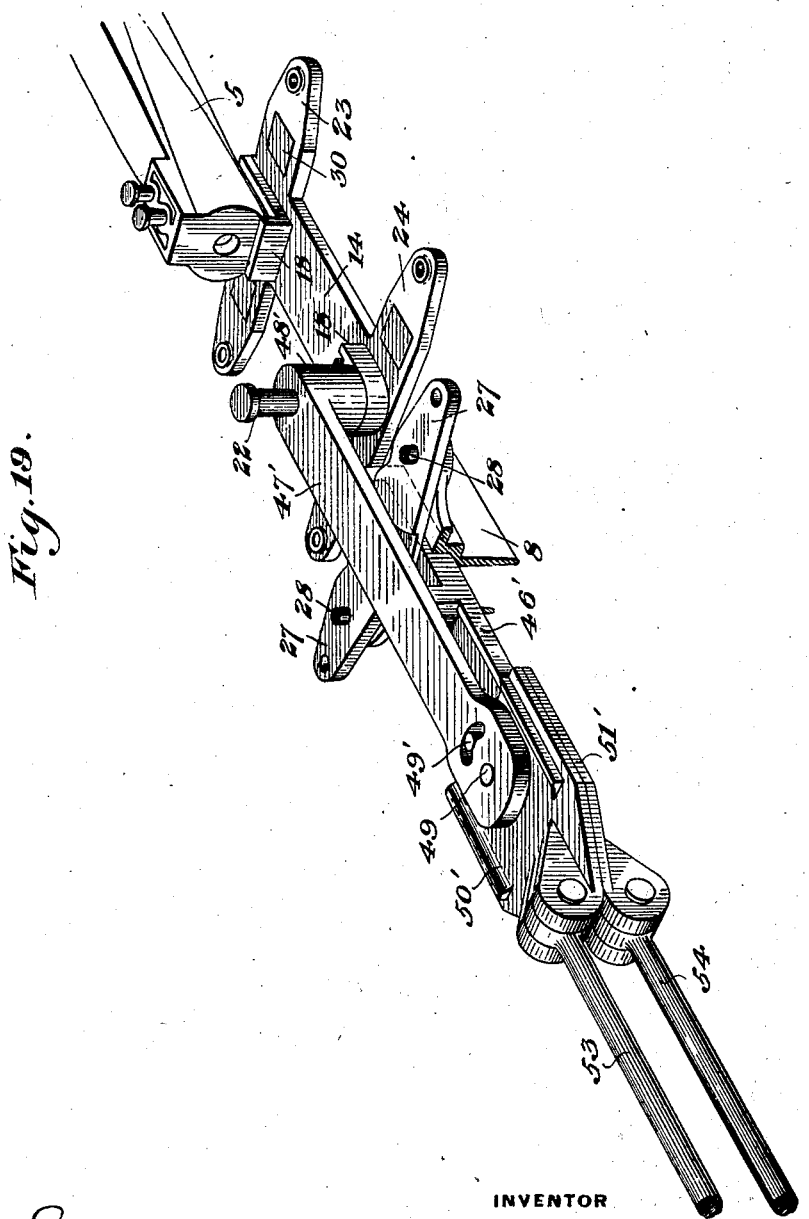

No. 727,545. Patented May 5, 1903.

UNITED STATES PATENT OFFICE.

HARRY T. KRAKAU, OF CLEVELAND, OHIO, ASSIGNOR TO THE NATIONAL MALLEABLE CASTINGS COMPANY, OF CLEVELAND, OHIO, A CORPORATION OF OHIO.

DRAFT-RIGGING.

SPECIFICATION forming part of Letters Patent No. 727,545, dated May 5, 1903.

Application filed December 19, 1901. Serial No. 86,510. (No model.)

*To all whom it may concern:*

Be it known that I, HARRY T. KRAKAU, of Cleveland, Cuyahoga county, Ohio, have invented a new and useful Draft-Rigging, of which the following is a full, clear, and exact description, reference being had to the accompanying drawings, forming part of this specification, in which—

Figure 3:
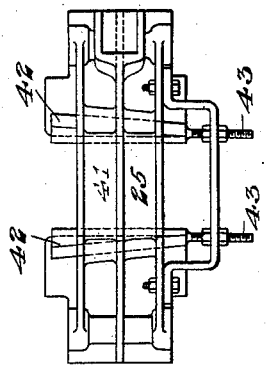
Figure 2:
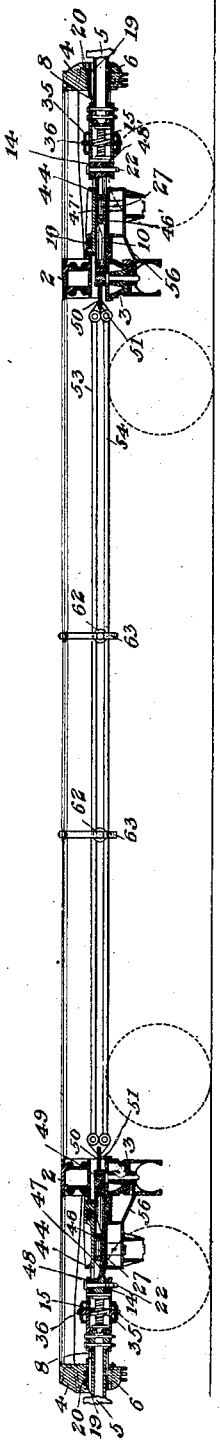
Figure 4:
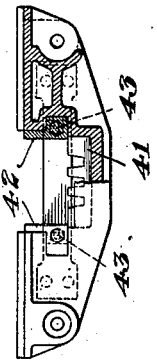
Figure 5:
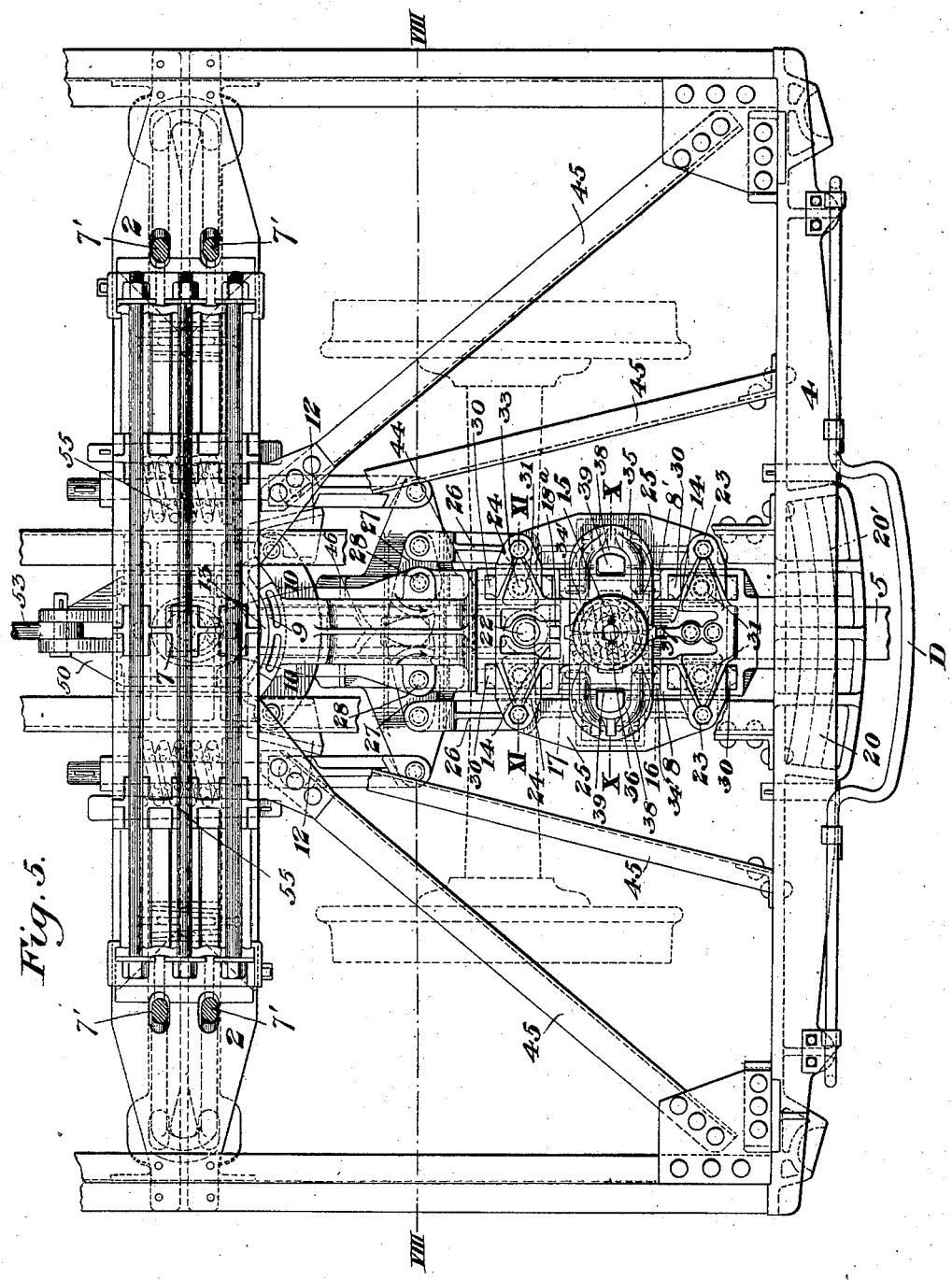
Figure 10:
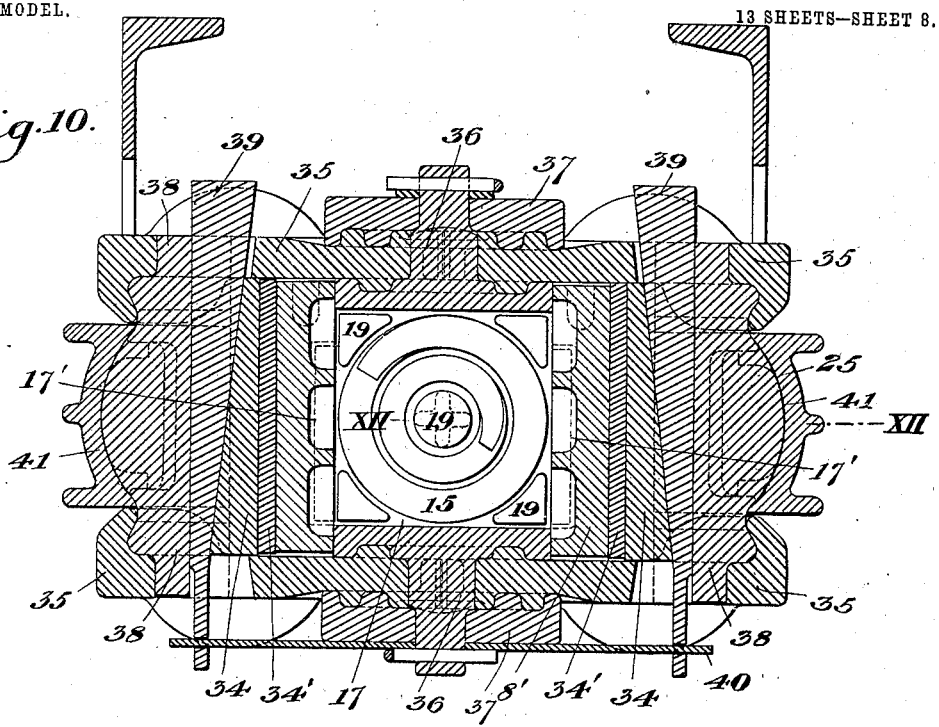
Figure 11:
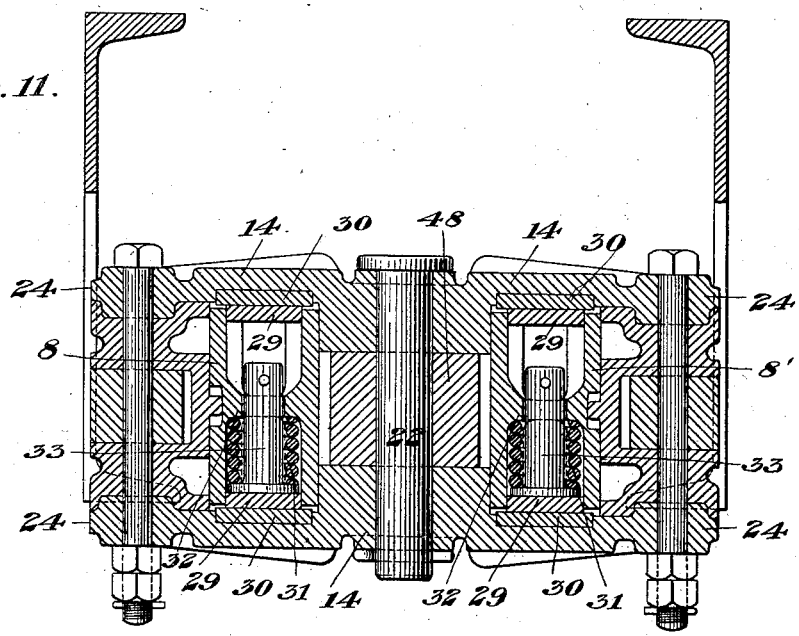

Figure 1 is a plan view of the frame of a car provided at both ends with my improved draft-rigging. Fig. 2 is a longitudinal central section of Fig. 1. Figs. 3 and 4 are detail views, on a larger scale, of a modification, showing slides for the adjustment of the friction device. Fig. 5 is a plan view of my improved draft-rigging at one end of the car. Fig. 6 is a side elevation showing the truck-bolster in section. Fig. 7 is a longitudinal section on the line VII VII of Fig. 1. Fig. 8 is a cross-section on the line VIII VIII of Fig. 5. Fig. 9 is an inverted plan view of the under side of the centering device. Fig. 10 is a cross-section through the friction device on the line X X of Fig. 5. Fig. 11 is a cross-section through the arms of the yoke on the line XI XI of Fig. 5. Fig. 12 is a horizontal section on line XII XII of Fig. 10. Fig. 13 is a vertical section through the bolster on the line XIII XIII of Fig. 7. Fig. 14 is a vertical section on the line XIV XIV of the same figure, showing the bolster in rear elevation. Fig. 15 is a plan, on a larger scale, of the slack-adjuster. Fig. 16 is a side elevation thereof. Fig. 17 is an end elevation of the same. Figs. 18 and 19 show in perspective draft-riggings at the opposite ends of the car, parts of which are broken away for better illustration, the purpose of these figures being to show the means by which the two draft-riggings are connected; and Fig. 20 is a modification.

My invention in some of its features is an improvement upon the draft-rigging for which I have obtained United States Letters Patent No. 11,904, reissued to me on April 9, 1901.

In the drawings, 2 represents the body-bolster of a car.

3 is the truck-bolster.

4 is the end sill, and 5 is the shank of a draw-bar supported beneath the end sill by a carry-iron 6.

The body-bolster is of peculiar truss construction and has a central king-post 7 and diagonal truss-rods 7'; but I do not claim it herein, as I have made it the subject of another application for Letters Patent.

A frame 8 extends back from the end sill nearly to the bolster, where it terminates in a head 9, suitably shaped to fit upon parallel segment-bars 10, which are curved from a center preferably substantially concentric with the axis of the center plate 11 of the car-truck. The segment-bars 10 are secured to or form part of a frame 12, which is secured to the car-bolster, and there is a metal backing-piece 13 preferably fixed to or made integral with the bolster, which is interposed between the end of the head 9 and the bolster 2, so as to back the head which constitutes the end of the draft-rigging and to transmit to the bolster the strains of buffing, and thus relieve the segment-bars 10.

The frame 8 may be a single casting or it may be made of several sections. The preferred form is sufficiently indicated without needing further description by the several cross-sectional views, the parts of the frame at the rear of the draw-bar being separated laterally into two branches 8 8', containing between them the yoke 14, which extends rearwardly from the draw-bar and contains the draft spring or springs 15 and the followers 16 17. At the outer sides of the followers are projections 18, fixed to or forming part of the yoke, and a spring-plate 18' is interposed between the branches of the yoke and between the projections 18 and the followers. Tongues on the plates fit in notches 18$^a$ in the yoke. The followers are adapted to be engaged by stops 17' on the frame 8 when they are at the limits of their motion. The followers have projections 19 at their middle and corners, Fig. 10, which engage and act as stops to check the compression of the spring before the spring passes the proper limit of its compression.

The frame 8 is movable radially on the segment 10 and at its front end is connected with the end sill 4 by a rib or ribs 20, Fig. 7, fitting in grooves 20' on the sill, so that the sill is well braced by the interposition of the frame 8 between the sill and bolster and is thus better able to withstand the strains of buffing. For a like purpose the end of the frame 8 is preferably abutted against a shoulder 21 on the end sill. In order to enable the coupler-lock to be operated at every angle at which the draw-bar may project from the end of the car, I prefer to employ curved uncoupling-crank D, Fig. 5, curved substantially on a radius equaling the distance between the coupler-lock and the axis of the center plates of the bolsters, and the chain E, which operates the lock, is connected movably with said crank, preferably by means of a wheel F, Figs. 5 and 7.

The yoke 14 is preferably made of two branches connected at the front end to the shank of the draw-bar and connected together at the rear end by a pin 22, Fig. 7. The yoke has laterally-projecting arms 23 24, Figs. 5 and 11, connected together by connecting-pieces 25, which impart strength and solidity to the device, and the arms 24 are provided with links 26, which are connected with levers 27, fulcrumed on pins 28 to the frame 8, Figs. 5, 18, and 19.

The yoke 14 slides upon the parts of the frame 8, Fig. 11, these parts being preferably fitted with wearing plates or shoes 29 30, and I prefer to draw the branches of the yoke upon the frame, so as to keep them parallel therewith, by means of springs 31, preferably four in number, fitted in sockets in the frame 8 at the rear and front ends of the yoke. Each spring bears at one end against a shoulder 32 on its socket and at the other end bears either directly or through the head of a stem 33 upon the wearing-plate 29. The tension of the springs thus acting on the yoke and frame forces the wearing-plates 29 at the upper and lower sides closely against their companion plates 30. An important function performed by this arrangement is that the yoke and its connected draw-bar are maintained in parallel relation to the frame 8 when the car and its adjacent car are on a level track and are prevented from sagging, while if one car is on a grade and the next car is on a level track the springs 31 will permit the yoke of the car on the grade to yield sufficiently to assume a position in line with the draw-bar of the level car and to keep the faces of both couplers in vertical parallel lines without straining the couplers. The couplers are thereby kept always free to act, and the binding of the knuckles which results from such sagging is prevented. The springs 31 may be otherwise placed. Thus in Fig. 20 I show a yoke 14$^a$ set between draft-timbers A and bearing on the upper and lower sides against plates B, one of which is pressed against the yoke by springs 31$^a$.

In order to provide further for resistance to the motion of the yoke 14 upon the frame 8, I prefer to use shoes 34, bearing against wearing-plates 34' on the sides of the frame and connected, preferably as described below, by toggle-levers with the yoke, so that as the yoke moves backward or forward in buffing or pulling the toggle-levers will be moved and will cause the shoes 34 to bind or press laterally against the sides of the friction-plate 34' and to slide thereon, while opposing to its motion a frictional resistance which increases in proportion to the force exerted upon the yoke by pulling or buffing. The preferred connection between the shoes and the yoke is shown clearly in Figs. 4, 5, and 10. Toggle-levers 35 are set above and below the yoke, and the members of the respective pairs of toggles extend to a stud 36 on the yoke and are connected pivotally to the yoke by a cap 37, Fig. 10, which fits on the stud, the toggles having grooves or ribs which fit in circular ribs or grooves in the cap and on the yoke. The toggle-levers above and below the yoke are connected by bearings 38, contained in lateral recesses 41 on the sides of the connections 25, and between these bearings and each shoe 34 is interposed a key 39, which is drawn inwardly by a spring 40 and which serves to keep the shoe fitting against its wearing-plate 34' and to take up wear automatically and maintain a constant distance between the surface of the wearing-plate and the axis of the outer bearing of the toggle. This causes the toggle to have a constant stroke unaffected by wear of the parts, and thus enables my device to act uniformly at all times.

I show in the modification illustrated in Figs. 3 and 4 means for adjusting the extent of the toggle action and the degree of friction exerted thereby. In these figures between the bearings 38 and the ends of the recess 41 are placed vertical wedges 42, having bolts 43 by which the wedges may be moved and adjusted to lengthen or shorten the distance between their inner parallel faces. When these wedges are set closely against the interposed bearing 38, so as to be as near to each other as possible, the toggles have no angular motion, for in such case the ends of the toggle-levers will move to the same extent as the joint in the middle; but by setting these wedges so as to afford loose motion between the ends of the recess and the bearing 38 the toggles are permitted to move to assume an angle to each other and to cause the friction-plates to exert a clamping action, which varies proportionately to the degree of such angle. This gives accurate and simple means for adjusting the action of the friction device to secure the greatest efficiency in practice. The skilled mechanic will understand that this adjusting device may be modified in many ways without departure from my invention.

The rear end of the yoke 14 is adapted to engage a stop portion 44 on the frame 8 and to be limited thereby in its backward motion. The frame 12 may be braced and connected by channels or rods 45 with the end sill.

Figs. 5, 7, 18, and 19 will illustrate the relation of the draft-rigging at the two ends of the car. At one end of the car (shown in Fig.

18) the ends of the levers 27 are engaged by a bar 46, which extends rearwardly past or between the segment-bars 10 and inside the frame 8 and is mounted slidingly upon a slide-bar 47, which slides upon the frame 8 and has at the front end a sleeve 48, fitting on the pin 22, and thus operatively connected to the yoke 14. At its rear end the bar 46 is connected by a pin 49 and a pin and slot 49', or other connection adapted to permit radial motion, to one of two sliding heads 50 51, which are preferably supported by guides 52 in the body-bolster, and the other of said heads is similarly connected to the slide-bar 47, Fig. 13. At the other end of the car, Fig. 19, the levers 27 are engaged at their inner ends by the slide-bar 46', which is connected to the head 51', and the bar 47' is pivotally connected at its rear end to the head 50' and at its front end by a sleeve 48' to the pin 22, and thus to the yoke 14. The arrangement of these connecting parts at the two ends of the car is thus reversed in position. The heads 50 and 51 are connected by rods 53 54 with the corresponding heads 50' and 51' at the other end of the car. It will thus be observed that the upper and lower longitudinally-movable members 46 47 at each end of the car are connected with the corresponding members at the other end and that the draw-bar at one end is (through its yoke 14) connected with the lower of said members and the draw-bar at the other end with the upper member at its end of the car. The other two members (the upper member at one end and the lower member at the other) are connected, respectively, with the lever mechanism 27, by which, as explained below, the friction devices can be operated.

In the operation of my device when the cars are passing a curve the draw-bars do not project rigidly in the middle longitudinal lines of the car-body; but they will swing laterally on centers substantially coincident with the center plates of the trucks. The draft is therefore always on a line which connects the center plates, and in passing around curves the cars will not cramp the couplers or draft-riggings, which will remain in alinement with each other and by reason of their flexibility will prevent straining and wearing of the parts of the car and truck. When the car is uncoupled, the draft-rigging is kept projecting in proper position at right angles from the truck by guide-rods 55', which extend from springs 55 on the truck-bolster 3, Figs. 7 and 9, to a holder-plate 56, which fits on the frame 8 and is connected thereto by keys 57 and 58, Figs. 8 and 9, so as to hold the frame at right angles to the truck. The holder-plate 56 has also, preferably, a connection 59 with the truck-bolster at a place concentric with the center plates and is adapted, as in Fig 9, to permit a slight longitudinal motion of the truck relatively to the frame 8, while the springs 55 permit a slight yielding motion when the car is coupled with another car not provided with my improvement. This is accomplished without cramping of the parts and without causing the springs 55 to put undue strain upon the segment-bars. When a pulling strain is exerted on the coupler, it will draw the yoke 14 forward, thus moving the projection 18 against 18' and then against the follower 17 and compressing the spring against the other follower 16, which is held by the stop 17' on the frame 8. The strain will thus be transmitted to the frame 8 by the followers 16 and also by the plates or shoes 34, which are forced frictionally against the frame and oppose resistance to the motion of the yoke. The strain thus transmitted to the frame 8 is exerted upon the end sill through the parts 45 and upon the curved segments 10 at the rear of the frame. The forward motion of the yoke will also draw with it the levers 27 and acting through the rods 53 and 54, as described below, upon the corresponding mechanism at the other end of the car will cause the springs and friction devices at both ends of the car to act in unison. When a buffing force is exerted upon the coupler, it will move the yoke 14 rearwardly, and by the action of the stud 36 and toggle-levers 35 will cause the plates or shoes 34 to bind frictionally upon the sides of the frame and to resist frictionally motion of the yoke, as above explained. It will also move the follower 16 back and will compress the spring against the follower 17, which is held by its stops on the frame 8 and transmits the strain through these stops to the frame and thence to the sill 4 and curved segments 10, as above explained, the pressure on the curved segments being relieved by the bearing of the head 9 of the frame 8 against the bolster through the piece 13, which is interposed between the head and bolster. The rearward motion of the yoke acting through the links 26 and levers 27 will turn these levers in the direction of the arrows a on their pivots 28 on the frame 8 and, as described below, will cause the buffing force to be transmitted by a pulling motion from one end of the car to the spring mechanism and friction devices at the other end.

The following is a description of the manner in which the motion of the draw-bar at either end of the car operates also the friction and spring device at the other end. (See Figs. 18 and 19.) The forward motion of the draw-bar in Fig. 18 moves with it the yoke 14, the bar 47, and head 51, and by the rod 54 the head 51' at the other end of the car, Fig. 19, is drawn back, thus moving the slide-bar 46. This in turn moves the levers 27, which, acting through the links 26, moves the yoke 14 and operates the friction devices at that end of the car, so when a buffing motion is imparted to the draw-bar of Fig. 18 it will move back with it the yoke 14, which, by means of the links 26, will turn the levers 27, and these will draw forward the bar 46 and head 50 and through the rod 53 will draw back the head 50' at the other end of the car. The back motion of the head 50' will through the bar 47' and pin 22 draw back the yoke 14 at that end of the car, and this yoke, acting through the toggle-levers 35, will operate the friction devices. By thus connecting the friction devices at the two ends of the car and causing them to work together and to transmit a buffing or pulling force at either end by a pulling motion of the connecting-rods to the corresponding devices at the other end both draft-riggings are caused to act in unison, their efficiency is increased, strain is removed from the car-frame, and the mechanism is rendered strong and more durable. By reason of the pivotal connection of the bars 46 and 47 to the plates 50 and 51 the continuous action of the device—i. e., the transmission of pulling and buffing force equally to both ends of the car—is accomplished, whether the car be on a curve or on a straight track.

If the rods 53 54 should break or be injured, the working of the other parts of the draft-rigging will not be prevented; but in such case the draft-rigging at each end of the car will operate independently of the other. I do not know of any prior device having this function, since heretofore injury to the so-called "continuous" connecting-rods has put the entire spring mechanism of the draft-rigging out of action.

In Fig. 2 I show convenient means for supporting the rods 53 and 54 from the car-body, consisting of rollers 62 and supports 63.

The advantages of my invention will be appreciated by those skilled in the art. It affords an operative car-gear in which the draft-rigging instead of being connected rigidly to the car-frame is movable with the motions of the truck, so that in traveling on curves no torsional strain is applied to the car-frame or to the coupler and wheels, which heretofore has been so destructive to rolling-stock; but the draft is exerted in natural lines without lateral strain or torsion, and I thus apply in a satisfactory and complete manner principles of draft analogous to the principles which have long been in use in wagons and other horse-drawn vehicles in which the shafts or pole are not connected directly to the body, but are connected thereto through the axle and center plate. My invention also affords a satisfactory friction device, simple in construction, and not subject to disarrangement by destructive wear, which has proved objectionable in devices heretofore employed.

In Figs. 15, 16, and 17 I show a device which I have invented for automatically taking up slack in the connections in advance of the rods 53 and 54, so that these rods will operate to transmit their motions to the draft-riggings at the ends of the car under all conditions of wear. 64 is a yoke, which at its forward end is connected by a projection and curved slot 65 to the bar 47, (as shown in Fig. 16,) so as to permit the necessary radial motion of the latter. At the rear portion the arms of the yoke 64 are provided with teeth 66, meshing with gear-wheels 67, or other suitable connections may be used, and the gear-wheels 67 mesh with teeth 68 at the end of the part 53' of the rod 53, which is divided for this purpose. The yoke 64 is also connected with a toothed segment 69, which meshes with teeth 70 at the end of the other section 53ª of the rod. The gear-wheels 67 and 69 or other like connections are mounted in a frame 71, and wedges 72 are provided for each of the sections 53' and 53ª, which bear at one end against shoulders on the end portions of these sections, and at the other end against shoulders 73 on the frame. If there should be any loose motion in the parts in advance of the rod 53 in the line of its connection, such loose motion will be transmitted to the yoke 64, which, moving forwardly, will turn the gears 67 and 69 so as to draw the ends of the sections 53' and 53ª toward each other, and thus shorten the rod 53 and compensate for the wear. At the same time the wedges 72 will sink in their cavities, and thus hold the parts in their newly-adjusted positions. To prevent the wedges from rising, I provide inclined locking-pawls 74, which bear at their lower ends against the sides of the wedges and at their upper ends bear against sockets 75 on the frame 71. Other suitable locking mechanism may be substituted. The gears 67 and 69 are preferably made so as to multiply the loose motion transmitted by the yoke 64, and thus to take up the slack more efficiently. The rod 53 is provided with a slack-adjuster at one end of the car and the rod 54 with a slack-adjuster at the other end of the car.

If desired, the gearing 66 67, connected to the section 53', may be omitted and only the gearing connected with the section 53ª employed, though I deem it preferable to employ both sets of gearing.

I claim—

1. The combination at both ends of the car of draw-bars, spring mechanism and friction mechanism, a connection between the said draw-bars and springs and friction mechanism adapted to cause them to operate together, and means for changing a buffing motion of one draw-bar into a pulling motion on the connection; substantially as described.

2. The combination of draft-riggings at both ends of a car, each adapted to swing laterally on a rear bearing, and a connection extending from one draft-rigging to the other, said connection being flexibly joined to the draft-riggings and adapted to permit the same to turn; substantially as described.

3. A draft-rigging arranged to be radially movable in a rear bearing and having in combination the draw-bar spring and followers and stops constituting a complete individually-operating draw-bar, and a connection at the rear of the spring mechanism leading from an extension of the draft-rigging to the draft-rigging at the other end of the car; substantially as described.

4. The combination of draft-riggings at both ends of a car, each adapted to swing laterally on a rear bearing, and a connection extending from one draft-rigging to the other, said connection being flexibly joined to the draft-riggings and adapted to permit the same to turn, and friction devices operated by said connection; substantially as described.

5. The combination at both ends of the car of draw-bars, and friction devices, a connection between the friction devices at the opposite ends of the car adapted to cause them to operate together, and means for changing a buffing motion of one draw-bar into a pulling motion on the connection; substantially as described.

6. The combination of draft-riggings at opposite ends of a car having longitudinally-movable members, each connected to the corresponding members at the opposite end, the draw-bar at one end of the car being connected with one of said members, and the draw-bar at the other end of the car being connected with the opposite member at its end of the car, the other two members being connected respectively with mechanism for operating the resisting parts of the draft-rigging; substantially as described.

7. The combination of draft-riggings at opposite ends of a car having longitudinally-movable members, each connected to the corresponding member at the opposite end, the draw-bar at one end of the car being connected with one of said members, and the draw-bar at the other end of the car being connected with the opposite member at its end of the car, the other two members being connected respectively with friction devices; substantially as described.

8. The combination of draft-riggings at opposite ends of a car, sliding heads 50 and 51, and longitudinally-movable bars connecting them respectively with the draw-bar and with the mechanism for operating resisting parts of the draw-bar, a pivotal connection between the heads and said bars, and connections between said heads and like parts at the other end of the car; substantially as described.

9. The combination of laterally-swinging draft-rigging and coupler, and an uncoupling-crank curved substantially on a radius extending from the center of motion of said draft-rigging to the coupler-lock, and a traveling connection between said crank and the lock; substantially as described.

10. The combination of the friction plates or surfaces, toggle-levers extending to a common center and adapted to actuate said plates, and a cap mounted on a pivot and connecting the ends of the toggles; substantially as described.

11. The combination of the friction plates or surfaces, toggle-levers extending to a common center and adapted to actuate said plates, a cap mounted on a pivot and connecting the ends of the toggles, and a yoke to which said pivot is attached and which is also connected with the toggles by a curved groove; substantially as described.

12. The combination of draft-riggings at both ends of a car, a rod connecting their operative parts, said rod being divided, a slack-adjuster connected with the sections of said rods, and adapted on longitudinal motion of the draw-bar to draw them together, and means by which the sections so drawn together are held; substantially as described.

13. The combination of draft-riggings at both ends of the car, a rod connecting their operative parts, said rod being divided, a slack-adjuster connected with the sections of said rods and adapted on longitudinal motion of the draw-bar to draw them together, wedges by which the sections so drawn together are held, and locks for the wedges; substantially as described.

14. The combination of draft-riggings at both ends of the car, a rod connecting their operative parts, said rod being divided, a slack-adjuster connected with the sections of said rod and adapted to draw them together, gearing connected with the sections of the rod and with the parts of the draft-rigging whose slack is to be taken up, and means for holding the sections of the rod when drawn together; substantially as described.

15. The combination of draft-riggings at opposite ends of the car, having longitudinally-movable members, oppositely-moving rods connecting the members of the draft-riggings, and slack-adjusters on the rods at respectively opposite ends of the car, connected with the portions of draft-riggings whose slack is to be taken up; substantially as described.

In testimony whereof I have hereunto set my hand.

HARRY T. KRAKAU.

Witnesses:
  D. W. CALL,
  O. W. LOOMIS.